US011619990B2

(12) United States Patent
Rosell et al.

(10) Patent No.: US 11,619,990 B2
(45) Date of Patent: Apr. 4, 2023

(54) CLASSIFICATION OF GLINTS USING AN EYE TRACKING SYSTEM

(71) Applicant: Tobii AB, Danderyd (SE)

(72) Inventors: Mikael Rosell, Danderyd (SE); Simon Johansson, Danderyd (SE); Johannes Kron, Danderyd (SE); Macarena Garcia Romero, Danderyd (SE)

(73) Assignee: TOBII AB, Danderyd (SE)

( * ) Notice: Subject to any disclaimer, the term of this patent is extended or adjusted under 35 U.S.C. 154(b) by 18 days.

(21) Appl. No.: 16/725,286

(22) Filed: Dec. 23, 2019

(65) Prior Publication Data

US 2020/0257358 A1  Aug. 13, 2020

(30) Foreign Application Priority Data

Dec. 21, 2018 (SE) .................................... 1851659-1

(51) Int. Cl.
*G06F 3/01* (2006.01)
*G06T 7/73* (2017.01)
*G06T 7/246* (2017.01)

(52) U.S. Cl.
CPC .............. *G06F 3/013* (2013.01); *G06T 7/248* (2017.01); *G06T 7/74* (2017.01); *G06T 2207/30201* (2013.01)

(58) Field of Classification Search
CPC .............. G06K 9/4604; G06K 9/00604; G06F 3/013; G06T 7/74; G06T 7/248; G06T 2207/30201; G02B 27/0093
See application file for complete search history.

(56) References Cited

U.S. PATENT DOCUMENTS

| 9,338,382 B2 | 5/2016 | Jiang |
| 9,940,518 B1 * | 4/2018 | Klingström ............ G06V 10/22 |

(Continued)

FOREIGN PATENT DOCUMENTS

| CN | 105828700 A | 8/2016 |
| CN | 106339087 A | 1/2017 |

(Continued)

OTHER PUBLICATIONS

Chinese Patent Application No. 201911325884.7, "Notice of Allowance", dated Jun. 3, 2021, 3 pages.

(Continued)

*Primary Examiner* — Pinalben Patel
(74) *Attorney, Agent, or Firm* — Kilpatrick Townsend & Stockton LLP

(57) ABSTRACT

There is provided a method, system, and non-transitory computer-readable storage medium for classifying glints using an eye tracking system of a head-mounted device, by obtaining the position of any glint present in a current image of the first eye; obtaining a dataset indicative of the respective position of at least one glint detected in one or more previously captured images of the first eye; and, for each glint present in current image, determining if the position of the glint corresponds to the position of a glint in the dataset and, if the positions correspond, classify the glint as a static glint. The static glints may be excluded from further processing in the eye tracking system. If there has been a movement of an eye of the user of the head-mounted device, embodiments may further comprise updating the dataset based on the current image.

15 Claims, 4 Drawing Sheets

(56) References Cited

U.S. PATENT DOCUMENTS

| | | | |
|---|---|---|---|
| 11,442,539 B2* | 9/2022 | Gebauer | G06K 9/6256 |
| 2013/0169531 A1* | 7/2013 | Jahnke | G06F 3/017 |
| | | | 345/158 |
| 2015/0098620 A1 | 4/2015 | Wu et al. | |
| 2015/0310253 A1 | 10/2015 | Agrawal et al. | |
| 2016/0025971 A1* | 1/2016 | Crow | G06F 1/163 |
| | | | 345/156 |
| 2020/0305708 A1* | 10/2020 | Krueger | G06F 3/012 |

FOREIGN PATENT DOCUMENTS

| | | |
|---|---|---|
| CN | 107533362 A | 1/2018 |
| CN | 107577341 A | 1/2018 |
| CN | 108780223 A | 11/2018 |
| EP | 3185211 A1 | 6/2017 |
| EP | 3207861 A2 | 8/2017 |
| EP | 3284395 A1 | 2/2018 |
| WO | 2015027289 A1 | 3/2015 |
| WO | 2015167906 A1 | 11/2015 |
| WO | 2018000020 A1 | 1/2018 |

OTHER PUBLICATIONS

European Patent Application No. 19214992.0, "Extended European Search Report", dated Apr. 23, 2020, 5 pages.
Guestrin, et al., "General Theory of Remote Gaze Estimation Using the Pupil Center and Corneal Reflections", IEEE Transactions on Biomedical Engineering, vol. 53, No. 6, Jun. 2006, pp. 1124-1133.
Kar, et al., "A Review and Analysis of Eye-Gaze Estimation Systems, Algorithms and Performance Evaluation Methods in Consumer Platforms", IEEE Access, vol. 5, Aug. 7, 2017, pp. 16495-16519.
SE1851659-1, "Search Report", dated Aug. 9, 2019, 3 pages.

* cited by examiner

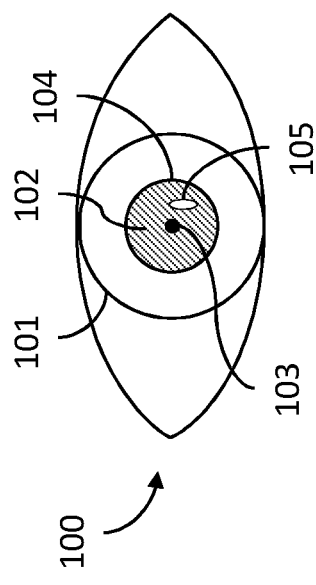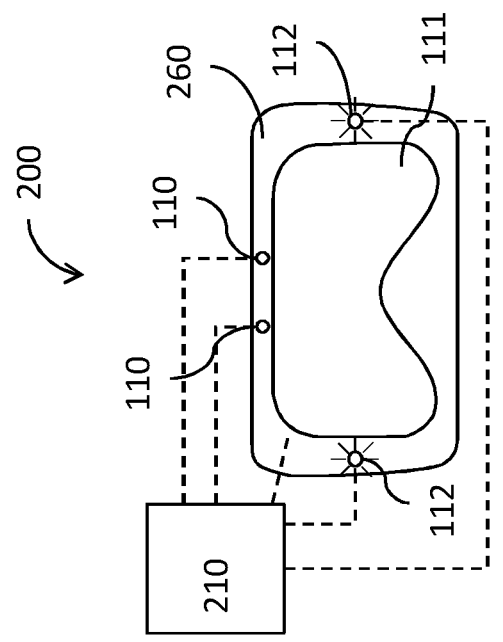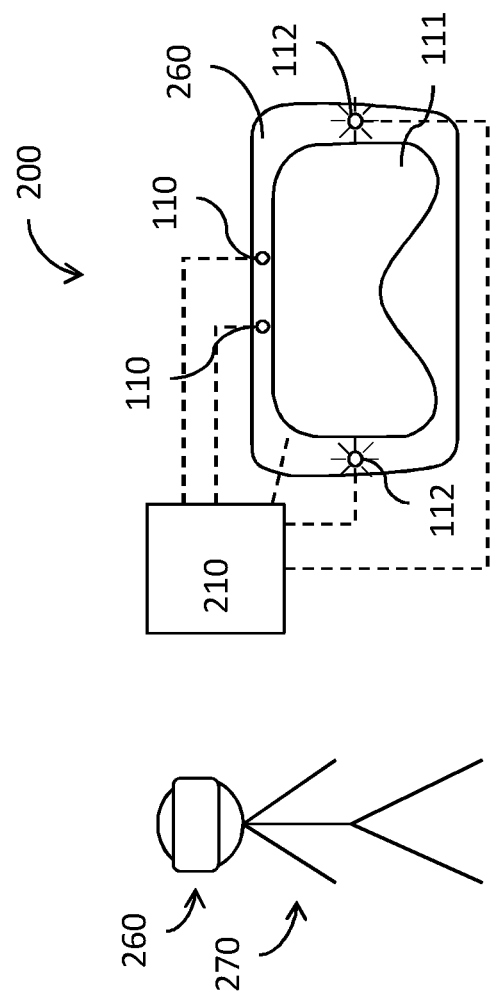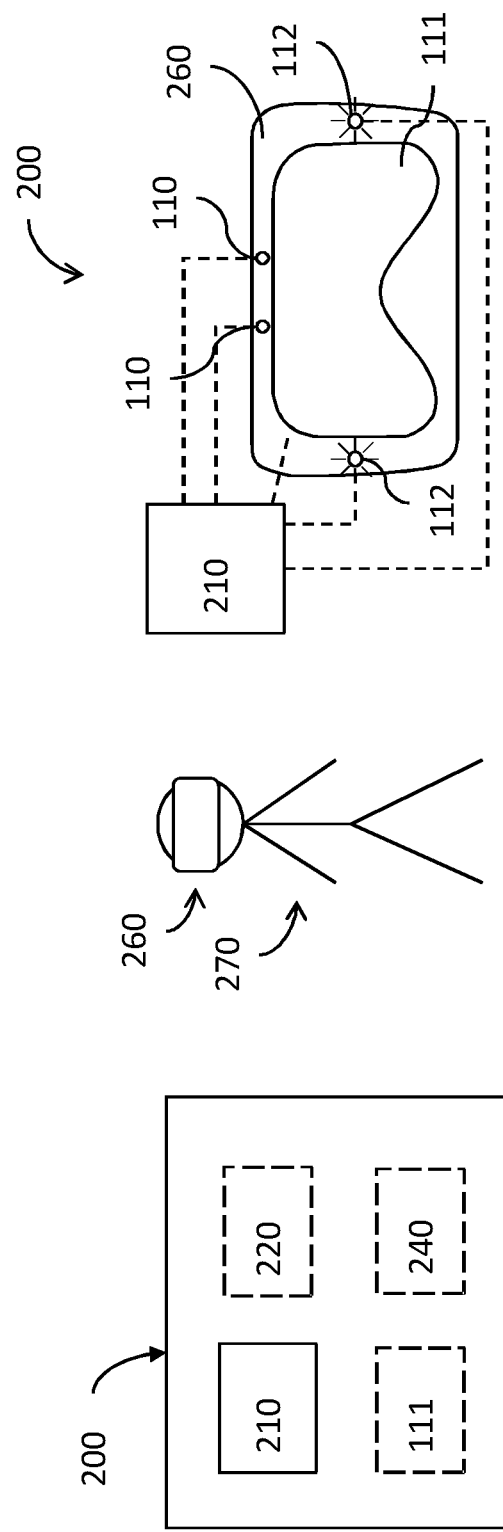

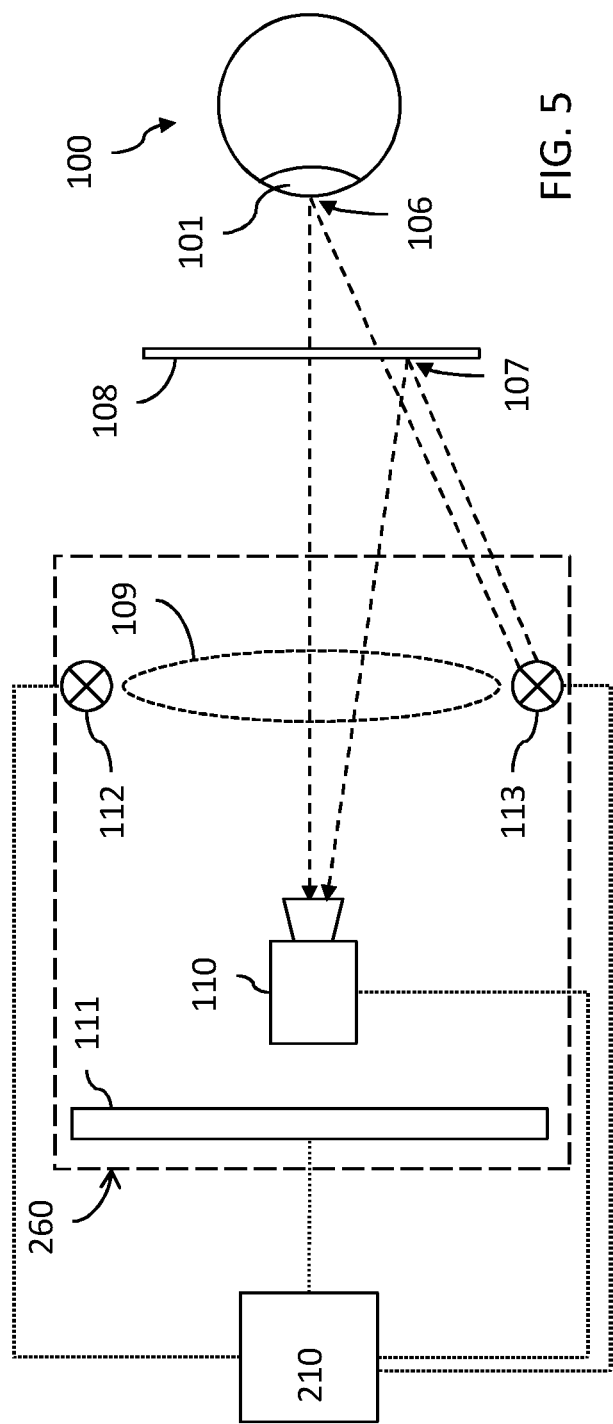
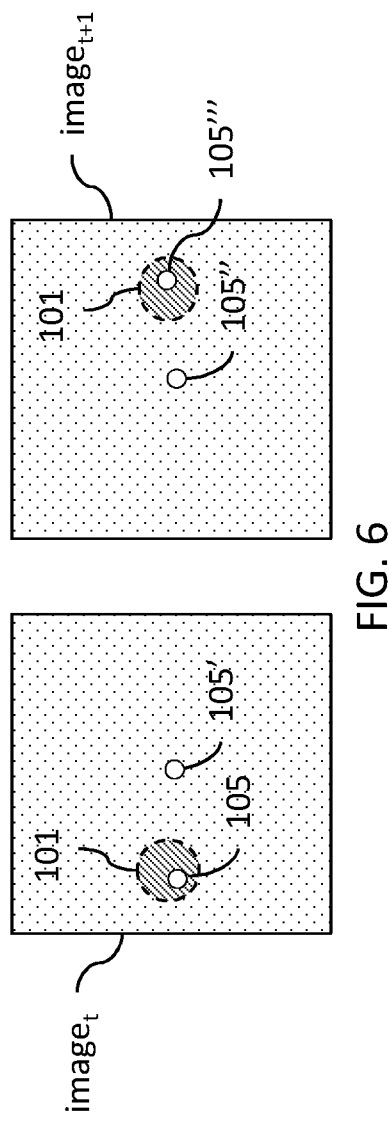

CLASSIFICATION OF GLINTS USING AN EYE TRACKING SYSTEM

CROSS-REFERENCES TO RELATED APPLICATIONS

This application claims priority to Swedish Application No. 1851659-1, filed Dec. 20, 2018; the content of which are hereby incorporated by reference.

TECHNICAL FIELD

The present disclosure generally relates to classifying glints, among glints identified by eye tracking in a head-mounted device. The present disclosure also relates to corresponding methods, systems and storage media.

BACKGROUND

Many existing eye tracking and gaze tracking solutions employ glint detection as a part of the tracking. For example, the main components of a corneal reflection eye or gaze tracking system may include a video camera sensitive to near-infrared (NIR) light, a NIR illuminator (often a light-emitting diode) typically mounted to emit light along the optical axis of the camera, and processing circuitry for analyzing images captured by the camera. NIR light is often employed, as users cannot see this light and are therefore not distracted by it. The corneal reflection eye or gaze tracking system typically projects light from the illuminator toward an eye of the user and monitors the angular difference between the pupil position and the reflection of a light beam. The light reflected from the eye comprises a "glint", which is a very small and very bright virtual image of the illuminator reflected from the cornea, typically the front surface of the corneal bulge of the eye. After an image of an illuminated eye has been captured, the processing circuitry is typically configured to perform image processing, e.g. including intensity thresholding and edge detection, to identify the glint and the pupil from the image captured by the camera. Using the information of the image processing, eye tracking and/or gaze tracking can then be performed.

If a glint is not accurately detected, this will introduce errors in the eye tracking and/or gaze tracking result. One common problem in glint detection is that when a user of an eye tracking or gaze tracking system is wearing glasses, the glasses provide a reflecting surface from which light from the illuminator is reflected towards the camera. Thereby, additional glints are introduced into the captured image, which are not caused by reflections from the cornea of an eye of the user. Glints caused by reflection of light from the glasses, or any other reflecting surface present between the camera and the eye of a user, may hereinafter be referred to as "false glints". Glints caused by reflections from the cornea of an eye of the user may hereinafter be referred to as "true glints".

False glints may cause severe eye tracking or gaze tracking problems, affecting both accuracy and precision of the eye tracking, or gaze tracking, system.

There is a need to provide solutions to one or more of the identified problems.

SUMMARY

Methods, systems and computer-readable storage media having the features defined in the independent claims are provided for solving or at least ameliorating one or more of the identified problems. Preferable embodiments are defined in the dependent claims.

Specifically, embodiments presented herein aim at achieving an optimized visual experience for the user, and to enable the best possible prerequisites for the performance of eye tracking or gaze tracking. The term eye tracking as used herein may be understood as comprising: tracking or observing actual parts of an eye, in the real world, in a 3D model of the eye, in a 2D image depicting the eye; or determining what the eye is tracking or gazing towards. Determination of what the eye is tracking or gazing towards may also be referred to as gaze tracking. The term eye tracking, if only this term is used, may therefore be understood to include gaze tracking.

These aims are achieved by providing solutions for classification of glints, specifically classification of static glints present in an image of an eye of the user, i.e. glints that do not move from one captured image frame from the next, even though the eye moves. Static glints are, as described herein, a specific type of false glints, i.e. glints that are not caused by a reflection of the cornea or any other part of the eye of the user. In other words, all static glints are false glints, but all false glints are not static glints.

The image of the eye of the user is captured using any type of imaging sensor, imaging device, camera or the like comprised in an eye tracking or gaze tracking system. Hereinafter, the term camera will be used, but it is to be understood that within the context of the present disclosure the term camera may refer to any type of imaging sensor, imaging device or the like configured to generate an image based on infalling light. In one or more embodiments, the eye tracking or gaze tracking system is comprised in a head mounted device.

In a first aspect, there are provided embodiments of a method for classifying glints using an eye tracking system of a head-mounted device, the method comprising:
obtaining, using the processing circuitry, the respective position of any glints present in a current image of a first eye of a user of the head-mounted device being illuminated by one or more illuminators, wherein the current image is captured at a succeeding time instance;
obtaining, using the processing circuitry, a dataset indicative of the respective position of at least one glint detected in one or more previously captured images of the first eye illuminated by the one or more illuminators;
wherein the method further comprises, for each obtained glint present in the current image:
determining, using the processing circuitry, if the position of the glint in the current image corresponds to the position of any of the detected glints in the dataset; and
if the position of the glint in the current image corresponds to the position of any of the detected glints in the dataset, classifying, using the processing circuitry, the glint as a static glint.

In some embodiments, the method may further comprise, before determining, using the processing circuitry, if the position of the glint in the current image corresponds to the position of any of the detected glints in the dataset, performing eye tracking, using processing circuitry, to determine if there has been a movement of the first eye of the user of the head-mounted device between a preceding time instance and the succeeding time instance, and if it is determined that there has been a movement of the first eye between the preceding time instance and the succeeding time instance, updating, using the processing circuitry, the dataset based on the respective position of any glints present in the current image.

The method may further comprise excluding, using the processing circuitry any static glints for further processing in the eye tracking system.

According to a second aspect, there are provided embodiments of an eye tracking system of a head-mounted device for classifying glints, the system comprising processing circuitry configured to:

obtain the respective position of any glints present in a current image of a first eye of a user of the head-mounted device being illuminated by one or more illuminators, wherein the current image is captured at a succeeding time instance;

obtain a dataset indicative of the respective position of at least one glint detected in one or more previously captured images of the first eye illuminated by the one or more illuminators, wherein the processing circuitry is further configured to, for each of the obtained at least one glints present in the current image:

determine if the position of the glint in the current image corresponds to the position of any of the detected glints in the dataset; and if the position of the glint in the current image corresponds to the position of any of the detected glints in the dataset, classify the glint as a static glint.

In some embodiments, the processing circuitry may further be configured to, if the position of the glint in the current image corresponds to the position of any of the detected glints in the dataset, perform eye tracking to determine if there has been a movement of the first eye of the user of the head-mounted device between a preceding time instance and the succeeding time instance, and if it is determined that there has been a movement of the first eye between the preceding time instance and the succeeding time instance, update the dataset based on the respective position of any glints present in the current image.

The processing circuitry may further be configured to exclude any static glints for further processing in the eye tracking system.

In a third aspect, there is provided a head mounted device comprising the eye tracking system according to any of the embodiments presented herein.

According to a fourth aspect, there is provided a non-transitory computer-readable storage medium storing instructions which, when executed by processing circuitry of a system, cause the system to:

obtain, using the processing circuitry, the respective position of any glints present in a current image of a first eye of a user of the head-mounted device being illuminated by one or more illuminators, wherein the current image is captured at a succeeding time instance;

obtain, using the processing circuitry, a dataset indicative of the respective position of at least one glint detected in one or more previously captured images of the first eye illuminated by the one or more illuminators, wherein the non-transitory computer-readable storage medium further stores instructions which, when executed by processing circuitry (210) of a system (200), cause the system to, for each obtained glint present in the current image:

determine, using the processing circuitry, if the position of the glint in the current image corresponds to the position of any of the detected glints in the dataset; and if the position of the glint in the current image corresponds to the position of any of the detected glints in the dataset, classify, using the processing circuitry, the glint as a static glint.

The non-transitory computer-readable storage medium may further store instructions which, when executed by processing circuitry of a system, cause the system to, if the position of the glint in the current image corresponds to the position of any of the detected glints in the dataset, perform eye tracking to determine if there has been a movement of the first eye of the user of the head-mounted device between a preceding time instance and the succeeding time instance, and if it is determined that there has been a movement of the first eye between the preceding time instance and the succeeding time instance, update the dataset based on the respective position of any glints present in the current image.

The non-transitory computer-readable storage medium may further store instructions which, when executed by processing circuitry of a system, cause the system to exclude any static glints for further processing in the eye tracking system.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In the following, example embodiments will be described in greater detail with reference to the accompanying drawings, in which:

FIG. 1 shows an image of an eye of a user;

FIG. 2 is a schematic overview of an eye tracking system for classification of glints, according to one or more embodiments;

FIG. 4a shows a schematic illustration of a user wearing a head-mounted device;

FIG. 4b shows a schematic illustration of a head-mounted device, according to one or more embodiments;

FIG. 5 shows a schematic overview of an eye of a user, a reflective surface, e.g. representing glasses worn by the user, and components of a head mounted device comprising eye tracking equipment;

FIG. 6 shows an example of true glints and false glints captured in images of an eye of a user;

Figure 3:
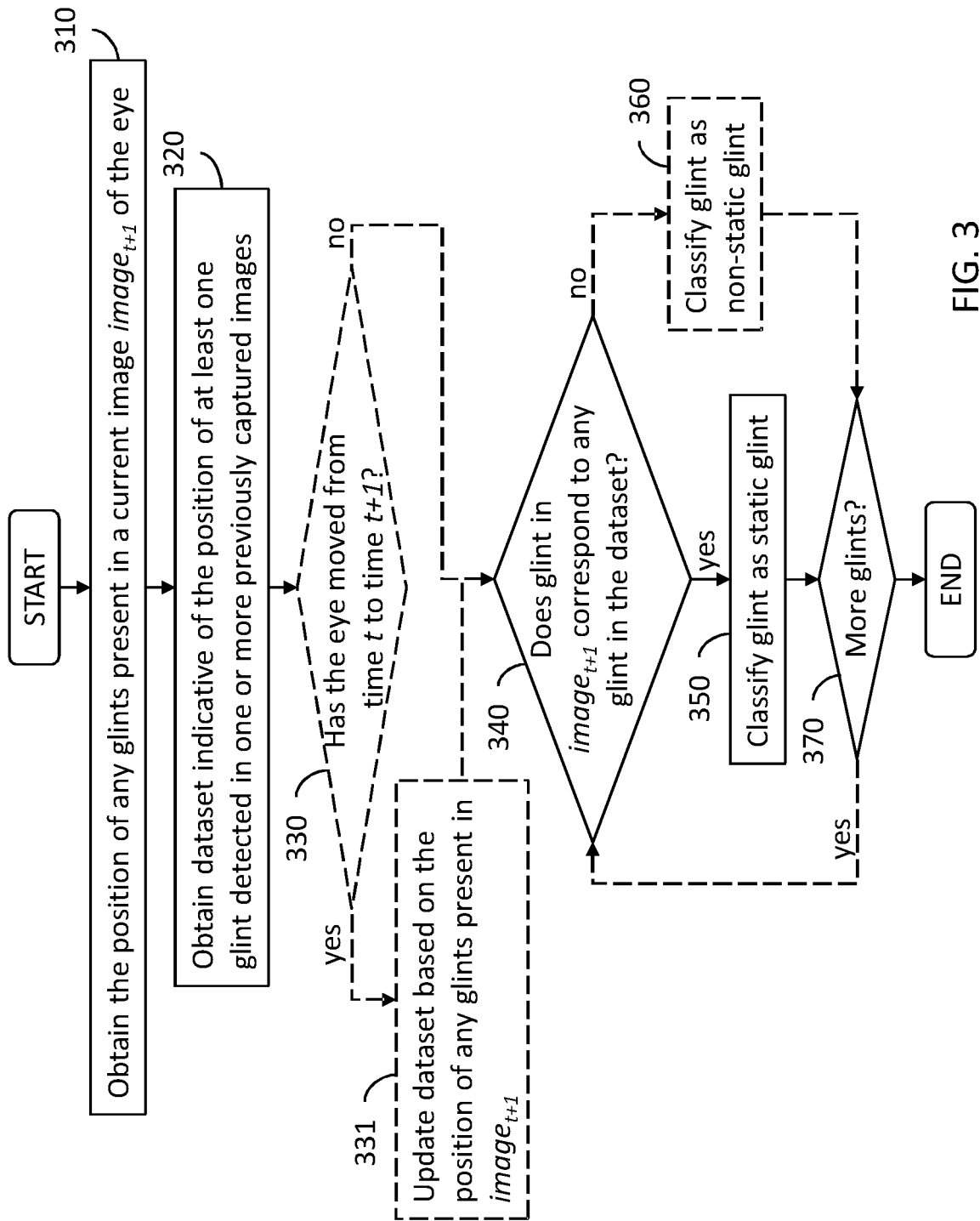
FIG. 3 is a flow chart of a method for classification of glints, according to one or more embodiments.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

Throughout the present disclosure, the term head-mounted device refers to a device adapted to be worn on the head of a user. The head-mounted device of the present has an eye tracking system. Typically, the head mounted device is configured to be arranged on the head of the user such that each of the camera or cameras of the eye tracking system of the head-mounted device are located in front of the face of the user and directed towards one or both of the user's eyes, such that the camera or cameras are enabled to capture images comprising the eye or eyes of the user.

The head-mounted device is assumed to be fixedly mounted on the head of the user during use, meaning that the head mounted device is not configured to, or intended to, move in relation to the head of the user during use. Thereby, there is provided a known, stationary relationship between at least one camera of the eye tracking system of the head-mounted device and any glasses of a user wearing the head-mounted device. There may in one or more embodiments be provided a known, stationary relationship between at least one camera of the eye tracking system of the head-mounted device, at least one illuminator of the eye tracking system of the head-mounted device, and any glasses of a user wearing the head-mounted device. In some embodiments, the head-mounted device may be in the form of a pair of glasses, configured to allow any private glasses of the user to be worn under the head-mounted device. In all embodiments herein, it is assumed that any private glasses worn by the user of the head-mounted device will be located between the eyes of the user and the camera or cameras of the eye tracking system of the head-mounted device during use. Therefore, if a user of a head-mounted device for XR wears glasses while using the head-mounted device, the problems described in the background may arise, because reflection of light from the glasses may cause false glints to be detected by an eye tracking or gaze tracking system of the head-mounted device.

A glint position remains relatively fixed in an observer's image field as long as the user's head remains stationary and the corneal sphere rotates around a fixed point. However, if the user's head does not remain stationary, or the corneal sphere does not rotate around a fixed point due to the user moving the eyes or gaze, the glint position will no longer remain relatively fixed in the observer's image field. However, the inventors have realized that since the glasses of a user wearing a head-mounted device are stationary relative to any camera comprised in an eye tracking or gaze tracking system of the head-mounted device, any glints that are caused by light from a specified illuminator comprised in an eye tracking or gaze tracking system of the head-mounted device being reflected in the glasses of the user will be located in the same position in any image captured by a specified camera of the eye tracking or gaze tracking system even if the eyes or gaze of the user moves. A glint that has a glint position which remains relatively fixed in an observer's image field even if the user's eyes or gaze moves is hereinafter referred to as a "static" glint. A static glint according to the present disclosure is thereby a kind of "false" glint, i.e. a glint that is not caused by reflections from the eye and should therefore not been included in processing of the captured images for eye tracking and/or gaze tracking purposes.

The inventors have further realized that if it is first determined that there has been a movement of an eye or gaze of a user between a preceding time instance to a subsequent time instance, any detected glint in an image captured at the subsequent time instance that is also found in the same corresponding position in an image captured at the preceding time instance can be classified as a static glint caused by the glasses, and hence not caused by the eye of the user.

Existing solutions for detecting false glints are typically complex, in that they may require one or more illuminators configured to emit light at alternating time instances and one or more cameras configured to capture images at the same alternating time instances, in combination with computationally expensive image processing taking into consideration parameters such as eye models, camera models, gaze directions, and/or light ray models. Single or multiple LED(s) being turned on or off to identify false glints is sometimes referred to as using LED logic. An example of related art disclosing solutions using LED logic can for example be found in the patent document U.S. Pat. No. 9,338,382 A1.

An advantage of the solution according to embodiments present herein is that no use of LED logic is required to identify the static glints. By classifying glints caused by glasses of a user as static, in accordance with any of the embodiments presented herein, a reliable solution of detecting false glints is thereby obtained that advantageously is significantly less computationally expensive, less time consuming and less complex than existing solutions for detecting false glints.

Embodiments of the present disclosure further aim at solving, or at least ameliorating, the ensuing problem that false glints (herein represented by static glints) are being processed as true glints in an eye tracking or gaze tracking system of a head-mounted device, thereby negatively effecting the result of the eye or gaze tracking. This is achieved by excluding the glints classified as static from further processing in the eye tracking or gaze tracking system of the head-mounted device.

One clear advantage of identifying static glints and excluding them from further processing is thus that the eye tracking or gaze tracking result becomes more accurate.

A further advantage is that the visual result and user experience is improved if the eye tracking or gaze tracking result becomes more accurate.

A yet further advantage is that the image processing and/or calculations that include the result of the glint detection are made more computationally inexpensive, faster and more efficient, as the static glints will not have to be taken into consideration by the processing circuitry.

In some embodiments, wherein the optics of the head-mounted device comprises a Fresnel lens, secondary reflections may additionally be caused by reflections in the grooves of the Fresnel lens, which leads to that each reflection of light from the glasses may cause multiple false glints in a captured image. Such additional, multiple, false glints caused by reflections from the glasses are also handled by embodiments of the present disclosure.

Embodiments presented herein perform optimally in an environment where no false glint caused by any external light source are present in images captured by the camera or cameras of the eye tracking or gaze tracking system, since such false glints cannot positively be classified as static or non-static glints in accordance with embodiments presented herein. This preferred condition is achieved for example in a head mounted device which is configured to not let in light from any external light source, for example by comprising a casing designed to not let the light of external light sources. Such a head set is hereinafter referred to as a "closed" head set. The same preferred condition may however also be obtained in an at least partly "open" head set (admitting light from external light sources to some extent), or other system configuration wherein there is a stationary relationship between the glasses of the user and the camera or cameras of the eye tracking or gaze tracking system being used, if the system is being used in an environment where there are no external light sources present that emit light in such a way that it may cause false glints in images captured by any camera of the eye tracking or gaze tracking system.

Embodiments herein may also work sufficiently well for "open" head mounted devices employing eye tracking or gaze tracking, or possibly even remote eye tracking or gaze tracking systems, which admit light from external light sources to some extent. In these cases, the false glints that are static according to the definition herein, i.e. caused by light from the illuminators of the eye tracking or gaze tracking system being reflected in the glasses of the user, will still be removed, thereby improving the eye tracking or gaze tracking result and making the image processing and/or calculations that include the result of the glint detection more computationally inexpensive, faster and more efficient.

In some embodiments, the head mounted device may be configured for extended reality (XR) applications. Hereinafter, when the term XR is used, this is to be interpreted as including a selection of at least the techniques referred to as VR, AR and MR. Eye tracking and gaze tracking solutions are today more and more commonly being used in head-mounted devices for virtual reality (VR), augmented reality (AR), mixed reality (MR) or other extended reality (XR) experiences.

The term eye tracking as used herein may be understood as comprising: tracking or observing actual parts of an eye, in the real world, in a 3D model of the eye, in a 2D image depicting the eye; or determining what the eye is tracking or gazing towards. Determination of what the eye is tracking or gazing towards may also be referred to as gaze tracking.

Any embodiment described herein as referring to one eye, for instance a first eye, of a user is of course equally applicable to the any of the user's eyes, and may also be performed for both the eyes of a user in parallel, or consecutively.

Throughout the present disclosure, the term obtaining information may be understood as receiving information, in a push fashion, and/or retrieving information, in a pull fashion.

Methods, systems, and associated storage media for classifying glints using an eye tracking system (200) of a head-mounted device (260) will be described below with reference to FIGS. 1-8. First, certain features of an eye will be described with reference to FIG. 1.

FIG. 1 is a front view of an eye 100. FIG. 5 comprises a cross sectional view of the eye 100 from the side of the eye 100. While FIG. 5 shows more or less the entire eye 100, the front view presented in FIG. 1 only shows those parts of the eye 100 which are typically visible from in front of a person's face. The eye 100 has a cornea 101 and a pupil 102, with a pupil center 103 and a pupil edge 104. In FIG. 1, a glint 105 is shown, in this case a "true" or "non-static" glint 106 caused by a reflection from the eye 100.

System Architecture

System embodiments will now be described with reference to FIGS. 2, 4a, 4b and 5.

FIG. 2 is a schematic overview of an eye tracking system 200 of a head-mounted device 260 for classification of glints 105, according to one or more embodiments. In FIG. 4a, a user 270 wearing a head-mounted device 260 is schematically illustrated. A head-mounted device 260 according to embodiments herein is schematically illustrated in FIG. 4b. The system 200 according to any embodiment presented herein may be incorporated in, or communicatively connected to, such a head-mounted device 260. FIG. 5 shows a schematic overview of an eye 100 of a user 270, a reflective surface 108, e.g. representing glasses worn by the user, components of a head mounted device 260 comprising eye tracking equipment 220, and processing circuitry 210. Turning first to FIGS. 2 and 4b, the system 200 comprises processing circuitry 210 configured to obtain a respective position of any glints 105 present in a current image image$_{t+1}$ of a first eye 100 of a user 270 of the head-mounted device 260, the first eye 100 being illuminated by one or more illuminators 112, 113 at the time of capture, wherein the current image image$_{t+1}$ is captured at a succeeding time instance t+1.

The processing circuitry 210 is further configured to obtain a dataset indicative of the respective position of at least one glint 105 detected in one or more previously captured images of the first eye 100 illuminated by the one or more illuminators 112, 113 and determine, for each of the obtained at least one glints 105 present in the current image image$_{t+1}$ if the position of the glint 105 in the current image image$_{t+1}$ corresponds to the position of any of the detected glints 105 in the dataset. If the position of the glint in the current image image$_{t+1}$ corresponds to the position of any of the detected glints 105 in the dataset, the processing circuitry 210 is configured to classify the glint 105 as a static glint 107.

To always have the most recent available information possible present in the dataset that is used for classification of the glints in the current image image$_{t+1}$, the processing circuitry 210 may further advantageously be configured to, before determining for each of the obtained at least one glints 105 present in the current image image$_{t+1}$ if the position of the glint 105 in the current image image$_{t+1}$ corresponds to the position of any of the detected glints 105 in the dataset: perform eye tracking to determine if there has been a movement of the first eye 100 of the user 270 of the head-mounted device 260 between a preceding time instance t and the succeeding time instance t+1 and, if it is determined that there has been a movement of the first eye 100 between the preceding time instance t and the succeeding time instance t+1, update the dataset based on the respective position of glints 105 present in the current image image$_{t+1}$, according to any embodiment described herein.

In one or more embodiment, wherein the eye tracking system 200 is configured to perform eye tracking to track an eye or gaze of the user 270 based on detected glints, the processing circuitry 210 may further be configured to exclude any static glint 107, i.e. any glint 105 classified as static, from further processing in the eye tracking system 200. In other words, in these embodiments any glint classified as static will not be used in the process of performing eye tracking to track an eye or gaze of the user 270 based on the detected glints.

As described herein, the head mounted device 260 illustrated in FIGS. 4a, 4b and 5 may comprise, or alternatively be communicatively connected to, the processing circuitry 210 configured according to any of the embodiments presented herein. The head-mounted device 260 may comprise display optics. The display optics is to be understood as comprising any optics suitable for generating and/or displaying 2D image data, 3D image data, graphical data, holographic data or other content that may be presented to a user/wearer of the head-mounted device to convey a VR, AR, MR or other XR experience. The display optics may comprise one or more displays 111, e.g. a single display 111 located in front of the eyes of the user 270, or one display 111 located in front of a first eye 100 of the user 270 and a second display located in front of a second eye of the user 270. The display optics may in some embodiments comprise a lens 109. As described herein, if the lens is a Fresnel lens, secondary reflections may additionally be caused by reflections in the grooves of the Fresnel lens, which leads to that each reflection of light from the glasses or other reflective surface 108 may cause multiple false glints in a captured image. Such additional, multiple, false glints caused by reflections from the glasses are also handled by embodiments of the present disclosure. In addition to the actual display optics, the head-mounted device typically also includes other components. Such other components may for example include circuits for powering the head-mounted device, sensors for detecting motion of the head-mounted device, eye or gaze tracking equipment, or a casing for protecting components of the head-mounted device. In other words, the term head-mounted device may, but should not necessarily, be construed as only referring to the actual display optics intended to be arranged in front of an eye of the user, or in front of both eyes of the user.

As illustrated in FIGS. 4b and 5, the processing circuitry 210 may in some non-limiting embodiments comprise, or be communicatively connected to, eye tracking equipment 220, for example in the form of one or more illuminators 112, 113 for illuminating the eye 100 of the user 270 and one or more cameras 110 for capturing images of the eye 100 while the eye 100 looks/gazes at the display 111 or in another direction, or any other suitable eye tracking equipment known in the art. The processing circuitry 210 may be communicatively connected to the eye tracking equipment 220 for example via a wired or wireless connection. The illuminators 112, 113 may for example be infrared or near infrared illuminators, for example in the form of light emitting diodes (LEDs). However, other types of illuminators may also be envisaged. The one or more cameras 110 may for example be charged-coupled device (CCD) cameras or Complementary Metal Oxide Semiconductor (CMOS) cameras. However, other types of cameras may also be envisaged.

The system 200 may further comprise, or be communicatively connected to, a display 111. The display 111 may for example be a liquid-crystal display (LCD) or a LED display. However, other types of displays may also be envisaged. The display may for example be flat or curved. The display 111 may for example be placed in front of one of the user's eyes. For any or all of the embodiments herein, separate displays 111 may alternatively be employed for the left and right eyes. Similarly, separate eye tracking equipment 220 (such as illuminators and cameras) may for example be employed for the left and right eyes.

The processing circuitry 210 may be employed for eye tracking for both eyes, or there may be separate processing circuitry 210 for the left and right eyes. The system 200 may for example perform eye tracking to determine movement of at least one of the left and right eyes, or both, and may then detect and classify glints in an image comprising at least one eye for which a movement has been detected.

The processing circuitry 210 may for example comprise one or more processors. The processor(s) may for example be application-specific integrated circuits (ASIC) configured to perform a specific eye tracking and position determination method. Alternatively, the processor(s) may be configured to execute instructions (for example in the form of a computer program) stored in one or more memories 240. Such a memory 240 may for example be comprised in the system 200, or may be external to (for example located remotely from) the system 200. The memory 240 may store instructions for causing the system 200 to perform a method according to any of the embodiments presented in connection with FIG. 3.

The processing circuitry 210 may in one or more embodiment be configured to perform any or all of the method embodiments described in connection with FIG. 3.

It will be appreciated that the system 200 described above with reference to FIGS. 2, and 4b is provided as an example, and that many other systems may be envisaged. For example, the system 200 may consist only of the processing circuitry 210. The display 111 may for example be comprised in the system 200, or may be regarded as separate from the system 200.

Eye tracking performed by systems such as the system 200 in FIG. 2 typically employ an eye model. This eye model is calibrated to properties of the individual user's eye or eyes.

FIG. 6 shows an example of true glints and static glints captured in images of the eye 100 of the user 270. In FIG. 6, this is illustrated by a preceding image, $image_t$, and a current image, $image_{t+1}$, captured at time instances t and t+1, respectively. Each of the preceding image $image_t$ and the current image $image_{t+1}$ comprises at least part of the cornea 101 of the eye 100 of the user 270. The position of the cornea 101 in the preceding image $image_t$ and the current image $image_{t+1}$ is indicated with a dashed outline. These positions are indicated for illustrational purposes, and need not be determined by method and system embodiments presented herein. As can be seen from FIG. 6, the preceding image $image_t$ comprises two glints 105 and 105', and the current image $image_{t+1}$ comprises two glints 105'' and 105m. As further seen from FIG. 6, the glints 105 and 105m are reflected from the cornea 101 of the eye 100 of the user 270, and are thus true glints 106, while the glints 105' and 105'' are not caused by a reflection from the cornea 101 of the eye 100 of the user 270, and are thus false glints 107 which should be excluded from further processing by the eye tracking system 200 in order to increase accuracy, save time and save computational power of the eye tracking system 200. Advantageously, the glints 105' and 105'' will be classified as static glints 107 (representing the same static glint in both the preceding image $image_t$ and the current image $image_{t+1}$), according to embodiments described herein. In some embodiments presented herein, the glints 105 and 105''' may further be classified as non-static glints.

Method Embodiments

Figure 7:
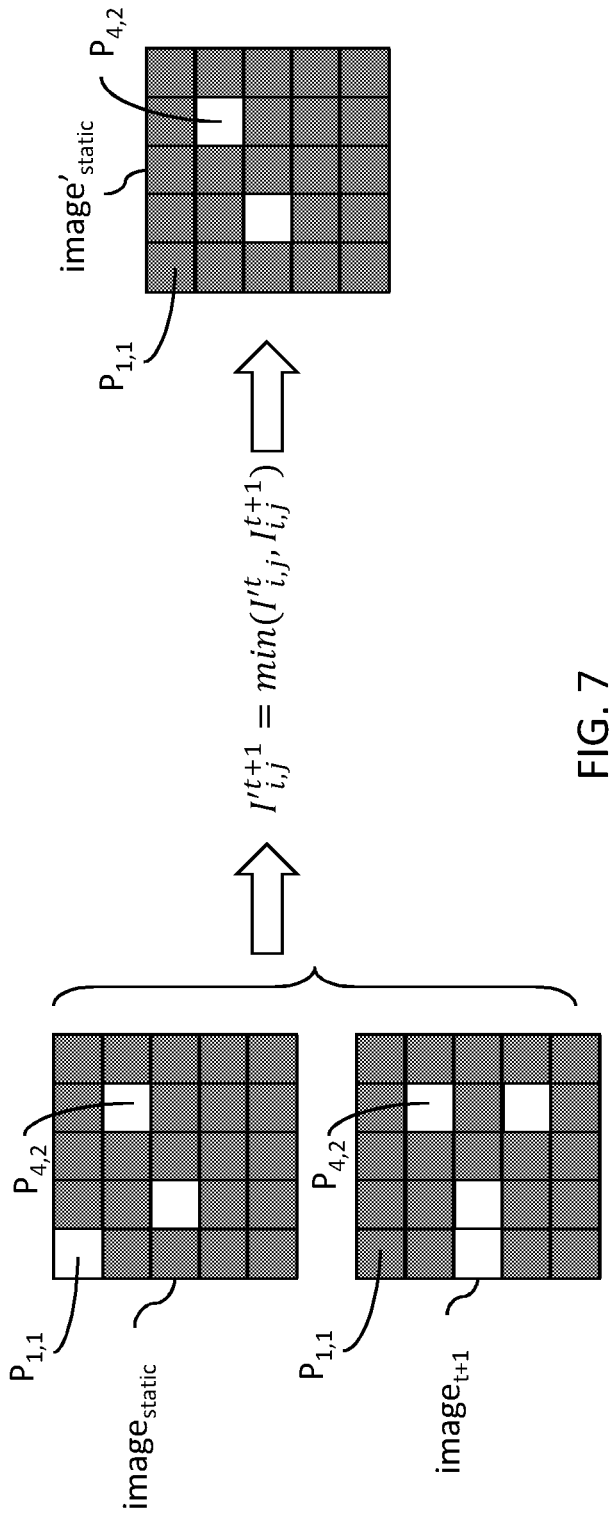
FIG. 7 shows a static glint image, a current image and an updated static glint image, according to one or more embodiments.

In the following, method embodiments will be described in connection with FIGS. 3, 7 and 8.

FIG. 3 shows embodiments of a method for classifying glints using an eye tracking system 200 of a head-mounted device 260, the method comprising:

In step 310: obtaining, using the processing circuitry 210, the respective position of any glints 105 present in a current image $image_{t+1}$ of the first eye 100 of a user 270 of the head-mounted device 260 being illuminated by one or more illuminators 112, 113, wherein the current image $image_{t+1}$ is captured at the succeeding time instance t+1.

The current image $image_{t+1}$ may be, but need not be, the same image as the second image $image_2$.

In one or more embodiment, the position of a glint 105 may be defined as one pixel coordinate or sub-pixel coordinate $P_{i,j}$, representing an approximated center of the detected glint 105. Optionally, if the detected glint 105 is approximated as a circle or ellipse, the information representing the position of the glint 105 may further comprise one or more radius parameters. In other embodiments, the position of a glint 105 may be defined as a group of connected pixels, having any suitable shape and size.

In some embodiments, obtaining the respective position of any glints 105 present in a current image $image_{t+1}$ comprises performing eye tracking in any manner known in the art, using the processing circuitry 210, to detect any glints 105 present in the current image $image_{t+1}$. In these embodiments, in case the glint positions are defined as more than one pixel or sub-pixel coordinate (e.g. in the case of a circle, ellipse or otherwise shaped group of connected pixels), the method step may further comprise comparing the distance between two detected glints and, if the distance is less than a preset threshold value $T_{EQUAL}$, determining that the detected glints 105 are part of the same glint 105, and processed as a single glint 105 in the following method steps.

In other embodiments, obtaining the respective position of any glints 105 present in a current image $image_{t+1}$ comprises retrieving or receiving, in the processing circuitry 210, detected respective position of any glints 105 present in the current image $image_{t+1}$ from a memory, e.g. the memory 240.

The current image $image_{t+1}$ of the first eye 100 may in some embodiments be the same image as the second image $image_2$ described in embodiments of step 330.

In step 320: obtaining, using the processing circuitry 210, a dataset indicative of the respective position of at least one glint 105 detected in one or more previously captured images of the first eye 100 illuminated by the one or more illuminators 112, 113.

In one or more embodiments, each of the one or more previously captured images of the first eye 100 illuminated by the one or more illuminators 112, 113 were captured at a respective time instance occurring before the succeeding time instance t+1.

Obtaining, using the processing circuitry 210, a dataset indicative of the respective position of at least one glint 105 detected in one or more previously captured images of the first eye 100 illuminated by the one or more illuminators 112, 113, may in one or more embodiments of step 330 be understood as receiving or retrieving the dataset from a memory, e.g. from the memory 240.

In some non-limiting embodiments, obtaining, using the processing circuitry 210, a dataset indicative of the respective position of at least one glint 105 detected in one or more previously captured images of the first eye 100 illuminated by the one or more illuminators 112, 113 may comprise generating a dataset indicative of the respective position of at least one glint 105 detected in one or more previously captured images of the first eye 100 illuminated by the one or more illuminators 112, 113, based on the one or more previously captured images of the first eye 100 illuminated by the one or more illuminators 112, 113, using the processing circuitry 210.

In one or more embodiment, the dataset indicative of at least one glint 105 detected in one or more previously captured images of the first eye 100 is a static glint image $image_{static}$ wherein the intensity value $I'_{i,j}$ associated with each respective pixel, or sub-pixel, coordinate $P_{i,j}$ in the static glint image $image_{static}$ corresponds to the minimum intensity value among the intensity values of the pixel, or sub-pixel, coordinate $P_{i,j}$ in the one or more previously captured images.

Of course, the static glint image $image_{static}$ need not be of the same size and/or resolution as the current image $image_{t+1}$, but may alternatively be of a different size and/or resolution. In a non-limiting example, the static glint image $image_{static}$ may be smaller than the current image $image_{t+1}$, and comprise a subset of the current image $image_{t+1}$, such as the eye 100 of the user 270 or a part of the eye 100 of the user 270, while the current image $image_{t+1}$ comprises the eye 100 or part of the eye 100 and also more of the face of the user 270 surrounding the eye 100. In such embodiments, a mapping function, mapping relationship or the like between the pixel or sub-pixel coordinates of the current image $image_{t+1}$ on the one hand and the pixel or sub-pixel coordinates of the static glint image $image_{static}$ on the other hand may be predefined or calculated. The method may in some embodiments comprise determining which pixel or sub-pixel coordinates of the static glint image $image_{static}$ that is associated with a specified pixel or sub-pixel coordinates of the current image $image_{t+1}$ based on such a mapping function, mapping relationship, or the like.

In other embodiments, the dataset indicative of at least one glint 105 detected in one or more previously captured images of the first eye 100 may be a list comprising one or more pixel, or sub-pixel, coordinates $P_{i,j}$ associated with each of the respective detected glints 105 of each of the one or more previously captured images of the first eye 100. The one or more previously captured images may comprise one, all of, or a selection of previously captured images. The selection may be made based on a preset criterion. In a non-limiting example, the last X captured frames (X being a suitably selected integer larger than 0) are comprised in the dataset, whereby the previously captured images used for generating the dataset are buffered in a first-in-first-out (FIFO) manner.

In an optional step 330: performing eye tracking, using processing circuitry 210, to determine if there has been a movement of a first eye 100 of the user 270 of the head-mounted device 260 between a preceding time instance t and a succeeding time instance t+1.

Performing eye tracking, using processing circuitry 210, to determine if there has been a movement of the first eye 100, may be done in any manner known in the art.

Determining if there has been a movement of an eye may include determining a movement in two dimensions (2D), by performing eye tracking to estimate 2D positions of an identified eye feature, e.g. the eye ball center, cornea, cornea center, pupil, pupil center, pupil edge, etc., in an image captured at the preceding time instance t and in an image captured at the succeeding time instance t+1, respectively, and comparing the positions of the identified eye feature in the image captured at the preceding time instance t and the image captured at the succeeding time instance t+1.

In a non-limiting example, determining, using the processing circuitry 210, if there has been a movement of the first eye 100 between the preceding time instance t and the succeeding time instance t+1 may comprise obtaining, using the processing circuitry 210, a first image $image_1$ of the first eye 100 of the user 270 of the head-mounted device 260, wherein the first image $image_1$ is captured at the preceding time instance t and obtaining, using the processing circuitry 210, a second image $image_2$ of the first eye 100, wherein the second image $image_2$ is captured at the succeeding time instance t+1. Thereafter, the method may comprise determining, using the processing circuitry 210, if there has been a movement of the first eye 100 between the preceding time instance t and the current instance t+1 based on the first image $image_1$ and the second image $image_2$.

In any of the embodiments described herein, obtaining an image may comprise receiving or retrieving the image from a camera 110 or a memory 240 of the eye tracking system 200, or from an external memory, or capturing the image using a camera 110 of the eye tracking system 200.

A movement between the images captured at different time instances can be determined in any known manner, e.g. by determining a pixel distance between the position of the detected eye feature in the images, and comparing the pixel distance to a predetermined threshold $T_{distance}$. Alternatively, or in combination with the above option, determining if there has been a movement of an eye may include determining if the image content has changed from time instance t to time instance t+1, based on an image of the eye captured using a camera of the eye tracking system 200 at time instance t and an image of the eye captured using the same camera at time instance t+1. In some embodiments, determining if the image content has changed may comprise comparing the pixel values of corresponding pixel coordinates in the two captured images, optionally including generating a difference image based on the two captured images. Based on the comparison, or on the difference image, determining if the image content has changed from time instance t to time instance t+1 may comprise determining if there is a difference between the pixel values of the corresponding pixels in the two captured images, for each pixel or a predetermined number of pixels. In some embodiment the determination further comprises determining that the eye has moved from time t to time t+1 if there is a difference between the pixel values of the two captured images for a number of pixel coordinates that is above a predetermined threshold value.

Alternatively, or in combination with any or both of the above options, determining if there has been a movement of an eye may include determining a movement of the eye in three dimensions based on comparison of an estimated position of an eye feature, e.g. the eye ball center, cornea, cornea center, pupil, pupil center, pupil edge, etc., at time instance t and t+1, respectively.

The processing circuitry 210 may correspondingly be configured to determine to if there has been a movement of the first eye 100 between the preceding time instance t and the succeeding time instance t+1 by performing any of all of the method embodiments described in connection with step 320.

If it is determined that there has been a movement of the first eye 100 between the preceding time instance t and the succeeding time instance t+1, the method continues with step the optional method step 331.

In an optional step 331: updating, using the processing circuitry (210), the dataset based on the respective position of any glints (105) present in the current image (image$_{t+1}$).

An advantage of performing the optional method step 330 of checking for eye movement and, if an eye movement is detected, performing step 331 of updating the dataset with the position of any glints 105 present in the current image image$_{t+1}$ is that the performance of these steps ensure that the most recent available information possible is present in the dataset that is used for classification of the glints in the current image image$_{t+1}$. Thereby, the classification is further improved.

In embodiments wherein the dataset is a static glint image image$_{static}$ updating the dataset based on the respective position of any glints 105 present in the current image image$_{t+1}$ may comprise updating the static glint image image$_{static}$, using the processing circuitry 210, by setting the respective intensity value $I'_{i,j}$ associated with each pixel, or sub-pixel, coordinate $P_{i,j}$ in the static glint image image$_{static}$ to:

$$I'_{i,j}{}^{t+1} = \min I'_{i,j}{}^{t}, I_{i,j}{}^{t+1} \qquad \text{(Eq. 1)}$$

wherein $I'_{i,j}{}^{t+1}$ is the updated, current, intensity value of the pixel or sub-pixel having pixel, or sub-pixel coordinate $P_{i,j}$ in the updated static glint image image$_{static}$'; $I'_{i,j}{}^{t}$ is the intensity value of the pixel or sub-pixel having pixel, or sub-pixel coordinate $P_{i,j}$ in the static glint image image$_{static}$ at time t; and $I_{i,j}{}^{t+1}$ is the intensity value of the pixel or sup-pixel having pixel, or sub-pixel coordinate $P_{i,j}$ in the in the current image image$_{t+1}$. The processing circuitry 210 may in these embodiments be configured to, after obtaining the dataset generate a current static glint image image'$_{static}$ based on the static glint image image$_{static}$, by setting the respective intensity value $I'_{i,j}$ associated with each pixel, or sub-pixel, coordinate $P_{i,j}$ in the current static glint image image'$_{static}$ according to Equation 1.

Thereby, any pixel, or sub-pixel, that represents a glint that is present in all captured images, i.e. both those already processed to generate the static glint image image$_{static}$ and the current image image$_{t+1}$, will be bright, i.e. have a high intensity value, while all other pixels will be substantially darker, i.e. have lower intensity values. This is illustrated in FIG. 7. FIG. 7 shows a static glint image image$_{static}$, a current image image$_{t+1}$ and an updated static glint image image$_{static}$', all having the same resolution in the figure for ease of illustration. High intensity pixels are in FIG. 7 illustrated as white pixels. Pixels having high intensity values in corresponding pixel positions in both the in the static glint image image$_{static}$ and the current image image$_{t+1}$, in this example pixels having the same pixel position since the images are of the same size, will also obtain a high intensity value in the updated static glint image image$_{static}$'. This is for example the case with the pixel or sub-pixel having pixel or sub-pixel coordinate $P_{4,2}$ in the illustration of FIG. 7. On the other hand, a pixel with corresponding pixel positions in the static glint image image$_{static}$ and the current image image$_{t+1}$ but high intensity value (shown as white in the figure) only in one of those images will be dark as it is assigned the lower of the two pixel intensity value in the updated static glint image image$_{static}$'. This is for example the case with the pixel or sub-pixel having pixel or sub-pixel coordinate $P_{1,1}$ in the illustration of FIG. 7.

After step 320, or after optional steps 330 and 331, the method further comprises classifying, using the processing circuitry 210, each of the obtained at least one glint 105 present in the current image image$_{t+1}$ according to the method steps 340, 350, and optionally also step 360, as described below.

In embodiments wherein the dataset is a list updating the dataset based on the respective position of any glints 105 present in the current image image$_{t+1}$ may comprise adding information on one or more pixel, or sub-pixel, coordinates $P_{i,j}$ associated with each of the obtained at least one glints 105 present in the current image image$_{t+1}$.

In some embodiments, the addition of the glint information relating to the current image image$_{t+1}$ may lead to deleting the glint information for the oldest image for which the respective position of any glints 105 present in the image is presently stored in the list. Thereby, a manageable size of the list is maintained.

In step 340: determining if the position of the glint 105 in the current image image$_{t+1}$ corresponds to the position of any of the detected glints 105 in the dataset.

In some embodiments, the current image image$_{t+1}$ and the one or more previously captured images each comprise pixels, wherein the position of a glint 105 is defined as one or more pixel, or sub-pixel, coordinates $P_{i,j}$ associated with each of the respective detected glints 105, wherein the dataset comprises an intensity value for with each of the one or more pixel, or sub-pixel, coordinates $P_{i,j}$ associated with each of the respective obtained at least one glints 105 present in the current image image$_{t+1}$. The intensity values $I_{i,j}$ comprised in the dataset, for each of the one or more pixel, or sub-pixel, coordinates $P_{i,j}$ associated with each of the respective obtained at least one glints 105 present in the current image image$_{t+1}$, may in some embodiments comprise a separate intensity value $I_{i,j}$ for the pixel or sub-pixel coordinate for each time instance that the previous images were captured. This is typically the case when the dataset is a list. In other embodiments, the intensity values $I_{i,j}$ comprised in the dataset, for each of the one or more pixel, or sub-pixel, coordinates $P_{i,j}$ associated with each of the respective obtained at least one glints 105 present in the current image image$_{t+1}$, may comprise a single intensity value for the pixel or sub-pixel coordinate. The single intensity value may be based on the intensity values of that pixel or sub-pixel coordinate in the previously captured images according to a predefined set of rules, e.g. as the minimum value of the intensity values of that pixel or sub-pixel coordinate in the previously captured images. This is typically the case when the dataset is a static glint image.

In one or more embodiments, determining if the position of the glint 105 in the current image image$_{t+1}$ corresponds to the position of any of the detected glints 105 in the dataset comprises, for each glint 105 in the current image image$_{t+1}$:
for each of the one or more pixel, or sub-pixel, coordinates associated with the glint 105:
determining a difference $I_{diff}$ between an intensity value $I_{i,j}$ of the pixel, or sub-pixel, having the one or more pixel, or sub-pixel, coordinates $P_{i,j}$ in the current image image$_{t+1}$ and an intensity value $I_{i,j}$ of the pixel, or sub-pixel, having the pixel, or sub-pixel, coordinates $P_{i,j}$ in the dataset.

If the difference $I_{diff}$ is below a predetermined threshold value T, it is determined that the position of the glint 105 in the current image image$_{t+1}$ corresponds to the position of the compared glint 105 in the dataset.

The processing circuitry 210 may in these embodiments correspondingly be configured to determine if the position of any obtained glints 105 present in the current image image$_{t+1}$ corresponds to the position of any of the detected glints 105 in the dataset, by, for each obtained glint 105 present in the current image image$_{t+1}$: for each of the one or more pixel, or sub-pixel, coordinates associated with the glint 105 determining a difference $I_{diff}$ between the intensity value of the pixel, or sub-pixel, having the pixel, or sub-pixel, coordinates $P_{i,j}$ in the current image image$_{t+1}$ and the intensity value $I'_{i,j}$ associated with the pixel, or sub-pixel, coordinates $P_{i,j}$ in the dataset. If the difference $I_{diff}$ is below a predetermined threshold value T, the processing circuitry 210 is in these embodiments configured to classifying the glint 105 as a static glint 107.

The number of previously captured images of the first eye 100 illuminated by the one or more illuminators 112, 113 that the dataset is based on may vary depending on whether there is a need to keep the computational load as small as possible and thereby use a low number of previously captured images, or if it is important to have the highest possible quality and accuracy and thereby use a high number of previously captured images. In some embodiments, the previously captured images used for generating the dataset are buffered in a first-in-first-out (FIFO) manner, to optimize both with regard to recent glint detection information and storing capacity of the memory in which the dataset is stored, e.g. memory 240.

As is well known, the intensity of an image pixel, or sub-pixel, may be represented in many different ways depending on e.g. the image format, the selected color space and how many channels or bits of information that are used for describing the pixel value of each pixel or sub-pixel. The embodiments presented herein are not dependent on how the intensity values are represented or obtained.

In the embodiments wherein the dataset is a list, determining, using the processing circuitry 210, if the position of the glint 105 in the current image image$_{t+1}$ corresponds to the position of any of the detected glints 105 in the dataset comprises determining, for each of the respective detected glints 105 in the current image image$_{t+1}$, based on the list, if at least one of the one or more pixel, or sub-pixel, coordinates $P_{i,j}$ associated with the glint 105 in the current image image$_{t+1}$ is also associated with a glint 105 in each of the one or more previously captured images of the first eye 100.

If at least one of the one or more pixel, or sub-pixel, coordinates $P_{i,j}$ associated with the glint 105 in the current image image$_{t+1}$ is also associated with a glint 105 in each of the one or more previously captured images of the first eye 100, the method comprises determining, using the processing circuitry 210, that the position of the glint 105 in the current image image$_{t+1}$ corresponds to the position of a detected glint 105 in the dataset. In other words, if a glint 105 appears in the same position or pixel/sub-pixel coordinate in all of the previous frames, and also in the same position or pixel/sub-pixel coordinate $P_{i,j}$ in the current image image$_{t+1}$, it is determined to be the same glint 105. Otherwise, if none of the at least one of the one or more pixel, or sub-pixel, coordinates $P_{i,j}$ associated with the glint 105 in the current image image$_{t+1}$ is also associated with a glint 105 in each of the one or more previously captured images of the first eye 100, the method comprises determining, using the processing circuitry 210, that the position of the glint 105 in the current image image$_{t+1}$ does not correspond to the position of any of the detected glints 105 in the dataset. The processing circuitry 210 may correspondingly be configured to determine if the position of the glint 105 in the current image image$_{t+1}$ corresponds to the position of any of the detected glints 105 in the dataset by performing any or all of these method steps. Of course, each of the one or more previously captured images of the first eye 100 need not be of the same size and/or resolution as the current image image$_{t+1}$, but may alternatively be of a different size and/or resolution. In such embodiments, a mapping function, mapping relationship or the like between the pixel or sub-pixel coordinates of the current image image$_{t+1}$ on the one hand and the pixel or sub-pixel coordinates of the previously captured images of the first eye 100 on the other hand may be predefined or calculated. The method may in some embodiments comprise determining which pixel or sub-pixel coordinates of a previously captured image of the first eye 100 that is associated with a specified pixel or sub-pixel coordinates of the current image image$_{t+1}$ based on such a mapping function, mapping relationship, or the like.

If it is determined that the position of the glint in the current image image$_{t+1}$ corresponds to the position of any of the detected glints 105 in the dataset, the method continues in step 350.

In some embodiments, if it is determined that the position of the glint in the current image image$_{t+1}$ does not correspond to the position of any of the detected glints 105 in the dataset, the method continues with optional step 360.

In step 350: classifying the glint 105 as a static glint 107.

In an optional step 360: classifying the glint 105 as a non-static glint.

In FIG. 3, there is further shown a decision step 370 for easier illustration of the fact that the method comprises classifying each of the obtained at least one glint 105 present in the current image image$_{t+1}$. However, the inclusion of step 370 may obviously be considered implicitly disclosed by the method description above, through the specification that the method comprises classifying each of the obtained at least one glint 105 present in the current image image$_{t+1}$.

The step 370, as an optional standalone step, or implicitly disclosed by the previous method steps, comprises checking if there are any more glints left 105 to process, or classify, among the obtained at least one glint 105 present in the current image image$_{t+1}$, and if there are any more glints left 105 to process, or classify, among the obtained at least one glint 105 present in the current image image$_{t+1}$: returning to step 340 for processing, or classification, of the next glint 105; or if there are no more glints left 105 to process, or classify, among the obtained at least one glint 105 present in the current image image$_{t+1}$: ending the method.

In combination with any of the embodiments presented herein for classifying glints, the method may further comprise excluding any static glints 107, i.e. glints classified as static according to method embodiments described herein, from further processing in the eye tracking system 200. In other words, false glints in the form of static glints will not affect the result of any subsequent eye tracking or gaze tracking performed by the system 200.

In case the head mounted device 260 moves in relation to the user's 270 eyes or glasses during use, e.g. by slippage of the head mounted device 260 when the user 270 moves, or if the user adjusts the position of the glasses, this may temporarily negatively affect the accuracy of the eye tracking functionality because information on previously classified static glints 107 may no longer apply. For instance, in embodiments wherein the dataset is a static glint image image$_{static}$, the information of all static glints 107 in the static glint image image$_{static}$ may be lost, since it will most likely no longer be true that a pixel or sub-pixel coordinates $P_{i,j}$ still comprises a high intensity value/is bright. And even if it is still bright, it may not represent the same glint, which is likewise a loss of information. Also, since the pixel value of each pixel, or sub-pixel, coordinate $P_{i,j}$ is according to these embodiments set to the minimum value of the intensity values $I_{i,j}$ for said pixel, or sub-pixel, coordinate $P_{i,j}$ in the static glint image image$_{static}$ and in the current image image$_{t+1}$, i.e. its historically lowest value based on the available pixel value information, a pixel that has wrongfully received a low intensity value when it in fact represents a static glint 107 will not be able to recover its correct, brighter, intensity value.

To ameliorate this problem in embodiments wherein the dataset is a static glint image image$_{static}$, the method may further comprise compensating for the possible loss of information due to slippage or the like, by adjusting the intensity value $\hat{I}_{i,j}$ for each pixel, or sub-pixel, coordinate $P_{i,j}$ in the current static glint image image'$_{static}$, using the processing circuitry 210, thereby obtaining an adjusted static glint image image'$_{static\_adjusted}$.

In one or more embodiments the method comprises adjusting the current static glint image image'$_{static}$, using the processing circuitry 210, by setting the intensity value I'$_{i,j}$ for each pixel, or sub-pixel, coordinate $P_{i,j}$ in the current static glint image image'$_{static}$ to:

$$\hat{I}_{i,j} = I_{max}(1-\alpha) + I'_{i,j}{}^{t+1} \times \alpha \quad \text{(Eq. 2)}$$

wherein $\hat{I}_{i,j}$ is the intensity value of the pixel or sub-pixel having pixel, or sub-pixel coordinate $P_{i,j}$ in the adjusted static glint image image'$_{static\_adjusted}$; I'$_{i,j}{}^{t+1}$ is the intensity value of the pixel or sub-pixel having pixel, or sub-pixel coordinate $P_{i,j}$ in the current static glint image image'$_{static}$; $I_{max}$ is the maximum intensity value that a pixel, or sub-pixel, can be assigned; and a is a weighting value. The processing circuitry 210 may in these embodiments be configured to adjust the current static glint image image'$_{static}$, by setting the intensity value I'$_{i,j}$ for each pixel, or sub-pixel, coordinate $P_{i,j}$ in the current static glint image image'$_{static}$ according to Equation 2.

Figure 8:
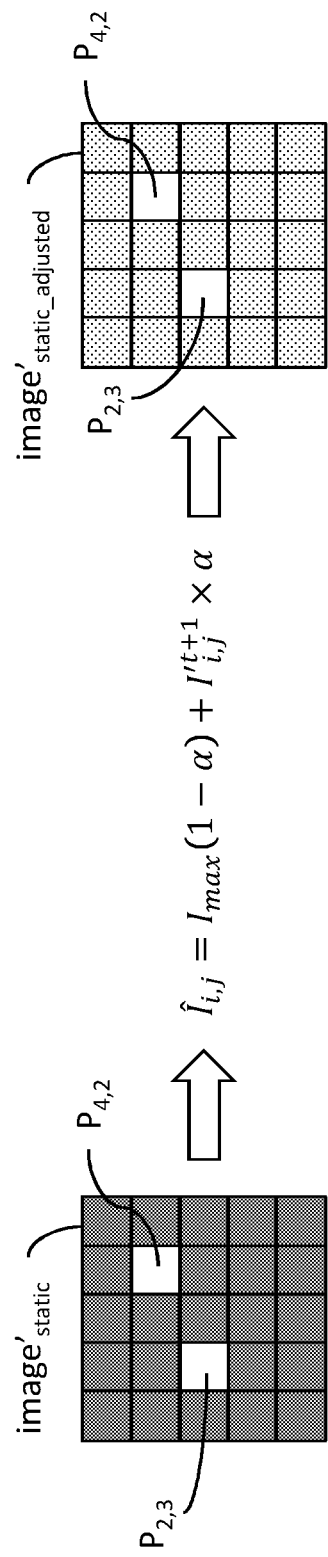
FIG. 8 shows adjustment of a current static glint image according to one or more embodiments.

Adjustment of the current static glint image image'$_{static}$, to compensate for possible loss of static glint information due to movements of the head mounted device 260 moves in relation to the user's 270 eyes or glasses during use, is illustrated in FIG. 8. FIG. 8 shows the example current static glint image image'$_{static}$ of FIG. 7 before adjustment, and the resulting, brighter, adjusted static glint image image'$_{static\_adjusted}$ after the adjustment. The current static glint image image'$_{static}$ as well as the adjusted static glint image image'$_{static\_adjusted}$ Of FIG. 8, each comprise two pixel coordinates $P_{2,3}$, $P_{2,3}$ that are associated with a respective glint that has been classified as a static glint according to embodiments presented herein 107.

The weighting value a may be represented in the form of an integer or floating point value. In two non-limiting examples, the weighting value a may be a value within the interval $0<\alpha<1$, or the interval $0<\alpha<255$. Of course, in what form the weighting value a is represented depends on how many bits of information are dedicated to its representation, and possibly also the sensitivity of the camera sensor pixels, or sub-pixels. The adjustment described in connection with Equation 2 may be performed before, after, or in parallel with step 340 of determining if the position of the glint 105 in the current image image$_{t+1}$ corresponds to the position of any of the detected glints 105 in the dataset.

The adjustment described in connection with Eq. 2 above will advantageously make the glint classification solution more robust, as the compensation lead to all pixels, or sub-pixels, of the static glint image image$_{static}$ becoming brighter with time and because of this static glint information that is lost due to movement of the head mounted device 260 in relation to the glasses of the user will not result in static glint information being irrevocably lost. Any pixel, or sub-pixel, coordinate $P_{i,j}$ in the static glint image image$_{static}$ that does not represent a static glint 107 will of course become dark again for every captured and processed image frame in which the intensity value of the pixel, or sub-pixel, coordinate $P_{i,j}$ is lower than the present intensity value of the pixel, or sub-pixel, coordinate $P_{i,j}$ in the static glint image image$_{static}$, whereby the static image image$_{static}$ showing static glints 107 is recovered. Such adjustment of the intensity values may in different embodiments be performed every time an image frame is captured, or at set time intervals, for every x frames, in accordance with system setting.

After classification according to any embodiment presented herein, the method may further comprise excluding any static glints 107 from further processing in the eye tracking system 200.

Further Embodiments

In one or more embodiment, there is provided a non-transitory computer-readable storage medium storing instructions which, when executed by processing circuitry 210 of the system 200, cause the system 200 to perform the method as defined in any of the method disclosed herein (in other words, in the claims, the summary, or the detailed description).

The non-transitory computer-readable storage medium may store instructions which, when executed by processing circuitry 210 of the system 200, cause the system 200 to obtain, using the processing circuitry 210, the respective position of any glints 105 present in a current image image$_{t+1}$ of a first eye 100 of a user 270 of the head-mounted device 260 being illuminated by one or more illuminators 112, 113, wherein the current image image$_{t+1}$ is captured at a succeeding time instance t+1; obtain, using the processing circuitry 210, a dataset indicative of the respective position of at least one glint 105 detected in one or more previously captured images of the first eye 100 illuminated by the one or more illuminators 112, 113; for each obtained glint 105 present in the current image image$_{t+1}$: determine, using the processing circuitry 210, if the position of the glint 105 in the current image image$_{t+1}$ corresponds to the position of any of the detected glints 105 in the dataset; and if the position of the glint in the current image image$_{t+1}$ corresponds to the position of any of the detected glints 105 in the dataset, classify, using the processing circuitry 210, the glint 105 as a static glint 107.

In one or more embodiments, the non-transitory computer-readable storage medium may further store instructions which, when executed by processing circuitry 210 of the system 200, cause the system 200 to perform eye tracking, using processing circuitry 210, to determine if there has been a movement of the first eye 100 of the user 270 of the head-mounted device 260 between a preceding time instance t and the succeeding time instance t+1 and, if it is determined that there has been a movement of the first eye 100 between the preceding time instance t and the succeeding time instance t+1, update, using the processing circuitry (210), the dataset based on the respective position of any glints (105) present in the current image (image$_{t+1}$).

The non-transitory computer-readable storage medium may for example be provided in a computer program product. In other words, a computer program product may for example comprise a non-transitory computer-readable storage medium storing instructions which, when executed by the processing circuitry 210 of the system 200, cause the system 200 to perform the method as defined in any of the method embodiments.

As described above with reference to FIG. 2, the storage medium need not necessarily be comprised in the system 200.

The person skilled in the art realizes that the present invention is by no means limited to the preferred embodiments described above. On the contrary, many modifications and variations are possible within the scope of the appended claims. For example, the embodiments described above with reference to FIG. 3 may, as explained herein, be combined to form further embodiments. Further, it will be appreciated that the system 200 shown in FIG. 2 is merely intended as an example, and that other systems may also perform the methods described above with reference to FIG. 3.

It will be appreciated that the processing circuitry 210 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

The invention claimed is:

1. A method for classifying glints using an eye tracking system of a head-mounted device, the method comprising:

obtaining, using the processing circuitry, the respective position of any glints present in a current image of a first eye of a user of the head-mounted device being illuminated by one or more illuminators, wherein the current image is captured at a succeeding time instance, wherein the current image comprises i*j pixels, wherein the position of each of the obtained glints present in the current image is defined as one or more pixel, or sub-pixel, coordinates, wherein the current image further comprises an intensity value associated with each of the one or more pixel, or sub-pixel, coordinates of the respective obtained at least one glints present in the current image, wherein the dataset comprises an intensity value for with each of the one or more pixel, or sub-pixel, coordinates associated with each of the respective obtained at least one glints present in the current image; and obtaining, using the processing circuitry, a dataset in a form of a static glint image indicative of the respective position of at least one glint detected in one or more previously captured images of the first eye illuminated by the one or more illuminators, wherein the static glint image the pixel, or sub-pixel, intensity value associated with each respective pixel, or sub-pixel, coordinate in the static glint image corresponds to the minimum intensity value among the intensity values of the pixel, or sub-pixel, coordinate in the one or more previously captured images;

generating a current static glint image based on the static glint image, using the processing circuitry, by setting the respective intensity value associated with each pixel, or sub-pixel, coordinate in the current static glint image to:

$$I'^{t+1}_{i,j} = \min(I'^{t}_{i,j}, I'^{t+1}_{i,j})$$

wherein $I'^{t+1}_{i,j}$ is the intensity value of the pixel or sub-pixel having pixel, or sub-pixel coordinate in the current static glint image, $I'^{t}_{i,j}$ is the intensity value of the pixel or sub-pixel having pixel, or sub-pixel, coordinate in the static glint image at time t, and $I^{t+1}_{i,j}$ is the intensity value of the pixel or sub-pixel having pixel, or sub-pixel, coordinate in the in the current image;

wherein the method further comprises, for each obtained glint present in the current image:

determining, using the processing circuitry, if the position of the glint in the current image corresponds to the position of any of the detected glints in the current static glint image by, for each obtained glint present in the current image:

for each of the one or more pixel, or sub-pixel, coordinates associated with the glint, determining a difference between the intensity value of the pixel, or sub-pixel, having the pixel, or sub-pixel, coordinates in the current image and the intensity value associated with the pixel, or sub-pixel, coordinate in the dataset, and if the difference is below a predetermined threshold value classifying the glint as a static glint; and if the position of the glint in the current image corresponds to the position of any of the detected glints in the dataset, classifying, using the processing circuitry, the glint as a static glint.

2. The method of claim 1, further comprising, before determining if the position of the glint in the current image corresponds to the position of any of the detected glints in the dataset:

performing eye tracking, using processing circuitry, to determine if there has been a movement of the first eye of the user of the head-mounted device between a preceding time instance and the succeeding time instance, and if it is determined that there has been a movement of the first eye between the preceding time instance) and the succeeding time instance, updating, using the processing circuitry, the dataset based on the respective position of any glints present in the current image.

3. The method of claim 1, further comprising adjusting the current static glint $$\hat{I}_{i,j} = I_{max}(1-\alpha) + I'^{t+1}_{i,j} \times \alpha$$

wherein $\hat{I}_{i,j}$ is the intensity value of the pixel or sub-pixel having pixel, or sub-pixel coordinate $P_{i,j}$ in the adjusted static glint image image'$_{static\_adjusted}$; $I'^{t+1}_{i,j}$ is the intensity value of the pixel or sub-pixel having pixel, or sub-pixel coordinate $P_{i,j}$ in the current static glint image image' static; $I_{max}$ is the maximum intensity value that a pixel, or sub-pixel, can be assigned; and $\alpha$ is a weighting value.

4. The method of claim 1, wherein the dataset indicative of at least one glint detected in one or more previously captured images of the first eye is a list comprising one or more pixel, or sub-pixel, coordinates associated with each of the respective detected glints of each of the one or more previously captured images of the first eye, wherein determining, using the processing circuitry, if the position of the glint in the current image corresponds to the position of any of the detected glints in the dataset comprises, for each of the respective detected glints in the current image comprises:

determining, based on the list, if at least one of the one or more pixel, or sub-pixel, coordinates associated with the glint in the current image is also associated with a glint in each of the one or more previously captured images of the first eye; and if at least one of the one or more pixel, or sub-pixel, coordinates associated with the glint in the current image is also associated with a glint in each of the one or more previously captured images of the first eye, determining that the position of the glint in the current image corresponds to the position of a detected glint in the dataset.

5. The method of claim 1, wherein determining, using the processing circuitry, if there has been a movement of the first eye between the preceding time instance and the succeeding time instance comprises: obtaining, using the processing circuitry, a first image of the first eye of the user of the head-mounted device, wherein the first image is captured at the preceding time instance;

obtaining, using the processing circuitry, a second image of the first eye, wherein the second image is captured at the succeeding time instance; and determining, using the processing circuitry, if there has been a movement of the first eye between the preceding time instance and the current instance based on the first image and the second image.

6. The method of claim 1, further comprising excluding any static glints from further processing in the eye tracking system.

7. An eye tracking system of a head-mounted device for classifying glints, the system comprising processing circuitry configured to:

obtain the respective position of any glints present in a current image of a first eye of a user of the head-mounted device being illuminated by one or more illuminators, wherein the current image is captured at a succeeding time instance, wherein the current image comprises i*j pixels, wherein the position of each of the obtained glints present in the current image is defined as one or more pixel, or sub-pixel, coordinates, wherein the current image further comprises an intensity value associated with each of the one or more pixel, or sub-pixel, coordinates of the respective obtained at least one glints present in the current image, wherein the dataset comprises an intensity value for with each of the one or more pixel, or sub-pixel, coordinates associated with each of the respective obtained at least one glints present in the current image and obtain a dataset in a form of a static glint image indicative of the respective position of at least one glint detected in one or more previously captured images of the first eye illuminated by the one or more illuminators, wherein the static glint image the pixel, or sub-pixel, intensity value associated with each respective pixel, or sub-pixel, coordinate in the static glint image corresponds to the minimum intensity value among the intensity values of the pixel, or sub-pixel, coordinate in the one or more previously captured images;

generating a current static glint image based on the static glint image, using the processing circuitry, by setting the respective intensity value associated with each pixel, or sub-pixel, coordinate in the current static glint image to:

$$I'^{t+1}_{i,j} = \min(I'^{t}_{i,j}, I'^{t+1}_{i,j})$$

wherein $I'^{t+1}_{i,j}$ is the intensity value of the pixel or sub-pixel having pixel, or sub-pixel coordinate in the current static glint image, $I'^{t}_{i,j}$ is the intensity value of the pixel or sub-pixel having pixel, or sub-pixel, coordinate in the static glint image at time t, and $I^{t+1}_{i,j}$ is the intensity value of the pixel or sub-pixel having pixel, or sub-pixel, coordinate in the in the current image;

wherein the processing circuitry is further configured to, for each of the obtained at least one glints present in the current image:

determine if the position of the glint in the current image corresponds to the position of any of the detected glints in the current static glint image; by, for each obtained glint present in the current image:

for each of the one or more pixel, or sub-pixel, coordinates associated with the glint, determining a difference between the intensity value of the pixel, or sub-pixel, having the pixel, or sub-pixel, coordinates in the current image and the intensity value associated with the pixel, or sub-pixel, coordinate in the dataset; and if the difference is below a predetermined threshold value classifying the glint as a static glint; and if the position of the glint in the current image corresponds to the position of any of the detected glints in the dataset, classify the glint as a static glint.

8. The eye tracking system of claim 7, wherein the processing circuit is further configured to, before determining if the position of the glint in the current image corresponds to the position of any of the detected glints in the dataset;

perform eye tracking to determine if there has been a movement of the first eye of the user of the head-mounted device between a preceding time instance and the succeeding time instance, and if it is determined that there has been a movement of the first eye between the preceding time instance and the succeeding time instance, update the dataset based on the respective position of any glints present in the current image.

9. The eye tracking system of claim 7, wherein the processing circuitry is further configured to adjust the current static glint image by setting the intensity value for each pixel, or sub-pixel, coordinate in the current static glint image to:

$$\hat{I}_{i,j} = I_{max}(1-\alpha) + I'^{t+1}_{i,j} \times \alpha$$

wherein $\hat{I}_{i,j}$ is the intensity value of the pixel or sub-pixel having pixel, or sub-pixel coordinate $P_{i,j}$ in the adjusted static glint image image'$_{static\_adjusted}$; $I'^{t+1}_{i,j}$ is the intensity value of the pixel or sub-pixel having pixel, or sub-pixel coordinate $P_{i,j}$ in the current static glint image image'$_{static}$; $I_{max}$ is the maximum intensity value that a pixel, or sub-pixel, can be assigned; and α is a weighting value.

10. The eye tracking system of claim 7, wherein the dataset indicative of at least one glint detected in one or more previously captured images of the first eye is a list comprising one or more pixel, or sub-pixel, coordinates associated with each of the respective detected glints of each of the one or more previously captured images of the first eye, wherein the processing circuitry is configured to determine if the position of the glint in the current image corresponds to the position of any of the detected glints in the dataset comprises, for each of the respective detected glints in the current image by:

determining, based on the list, if at least one of the one or more pixel, or sub-pixel, coordinates associated with the glint in the current image is also associated with a glint in each of the one or more previously captured images of the first eye; and if at least one of the one or more pixel, or sub-pixel, coordinates associated with the glint in the current image is also associated with a glint in each of the one or more previously captured images of the first eye, determining that the position of the glint in the current image corresponds to the position of a detected glint in the dataset; or if none of the at least one of the one or more pixel, or sub-pixel, coordinates associated with the glint in the current image is also associated with a glint in each of the one or more previously captured images of the first eye, determining that the position of the glint in the current image does not correspond to the position of any of the detected glints in the dataset.

11. The eye tracking system of claim 7, wherein the processing circuitry is configured determine to if there has been a movement of the first eye between the preceding time instance and the succeeding time instance by:

obtaining a first image of the first eye of the user of the head-mounted device, wherein the first image is captured at the preceding time instance;

obtaining a second image of the first eye, wherein the second image is captured at the succeeding time instance; and determining if there has been a movement of the first eye between the preceding time instance and the current instance based on the first image and the second image.

12. The eye tracking system of claim 7, wherein the processing circuitry is further configured to exclude any glint classified as a static glint from further processing in the eye tracking system.

13. A head-mounted device comprising the eye tracking system of claim claim 7.

14. The head-mounted device of claim 13, wherein the head-mounted device is configured to not let in light from any surrounding light source.

15. A non-transitory computer-readable storage medium storing instructions which, when executed by processing circuitry of a system, cause the system to:

obtain, using the processing circuitry, the respective position of any glints present in a current image of a first eye of a user of the head-mounted device being illuminated by one or more illuminators, wherein the current image is captured at a succeeding time instance, wherein the current image comprises i*j pixels, wherein the position of each of the obtained glints present in the current image is defined as one or more pixel, or sub-pixel, coordinates, wherein the current image further comprises an intensity value associated with each of the one or more pixel, or sub-pixel, coordinates of the respective obtained at least one glints present in the current image, wherein the dataset comprises an intensity value for with each of the one or more pixel, or sub-pixel, coordinates associated with each of the respective obtained at least one glints present in the current image; and obtain, using the processing circuitry, a dataset in a form of a static glint image indicative of the respective position of at least one glint detected in one or more previously captured images of the first eye illuminated by the one or more illuminators, wherein the static glint image the pixel, or sub-pixel, intensity value associated with each respective pixel, or sub-pixel, coordinate in the static glint image corresponds to the minimum intensity value among the intensity values of the pixel, or sub-pixel, coordinate in the one or more previously captured images;

generating a current static glint image based on the static glint image, using the processing circuitry, by setting the respective intensity value associated with each pixel, or sub-pixel, coordinate in the current static glint image to:

$$I'^{t+1}_{i,j} = \min(I'^{t}_{i,j}, I'^{t+1}_{i,j})$$

wherein $I'^{t+1}_{i,j}$ is the intensity value of the pixel or sub-pixel having pixel, or sub-pixel coordinate in the current static glint image, $I'^{t}_{i,j}$ is the intensity value of the pixel or sub-pixel having pixel, or sub-pixel, coordinate in the static glint image at time t, and $I^{t}_{i,j}$ is the intensity value of the pixel or sub-pixel having pixel, or sub-pixel, coordinate in the in the current image;

wherein the non-transitory computer-readable storage medium further stores instructions which, when executed by processing circuitry of a system, cause the system to, for each obtained glint present in the current image:

determine, using the processing circuitry, if the position of the glint in the current image corresponds to the position of any of the detected glints in the current static glint image; by, for each obtained glint present in the current image:

for each of the one or more pixel, or sub-pixel, coordinates associated with the glint, determining a difference between the intensity value of the pixel, or sub-pixel, having the pixel, or sub-pixel, coordinates in the current image and the intensity value associated with the pixel, or sub-pixel, coordinate in the dataset; and if the difference is below a predetermined threshold value classifying the glint as a static glint; and if the position of the glint in the current image corresponds to the position of any of the detected glints in the dataset, classifying, using the processing circuitry, the glint as a static glint; and if the position of the glint in the current image corresponds to the position of any of the detected glints in the dataset, classify, using the processing circuitry, the glint as a static glint.

* * * * *